United States Patent [19]
Fanaritis

[11] 3,795,057
[45] Mar. 5, 1974

[54] FLUIDIZED BED PROCESS

[75] Inventor: John Peter Fanaritis, Warren, Pa.

[73] Assignee: Struthers Scientific and International Corporation, New York, N.Y.

[22] Filed: June 6, 1972

[21] Appl. No.: 260,149

[30] Foreign Application Priority Data
June 18, 1971  Great Britain.................... 28755/71

[52] U.S. Cl. .............................. 34/10, 159/DIG. 3
[51] Int. Cl. ......................... F26b 3/08, F26b 17/10
[58] Field of Search.......... 34/10, 57 R, 57 A, 57 D; 159/4 A, 4 CC, 4 VM, DIG. 3

[56] References Cited
UNITED STATES PATENTS
3,629,955  12/1971  Davis............................ 159/4 CC X
3,519,054  7/1970  Cavataio et al. ............. 159/4 CC X Primary Examiner—Meyer Perlin
Assistant Examiner—William C. Anderson

[57] ABSTRACT

In a fluidized bed dryer or reactor in which particles are aggregated or coated to form granules, a two stage granulation process is provided in two vertically separated fluidized beds in a single chamber. In a drying process, heat may be added between the fluidized beds.

1 Claim, 1 Drawing Figure

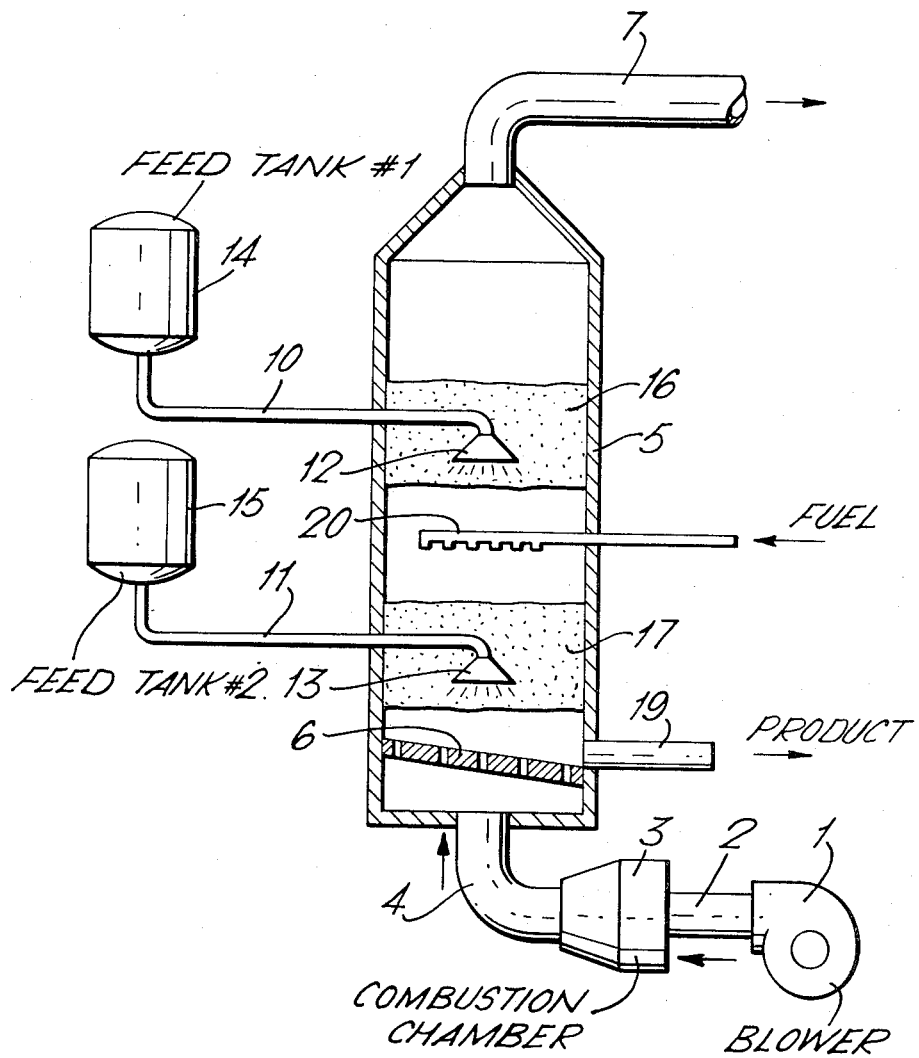

FLUIDIZED BED PROCESS

BRIEF DESCRIPTION OF THE DRAWING

The FIGURE of the drawing is a schematic diagram of apparatus used in the practice of this invention, the fluidizing chamber being shown in vertical section.

DESCRIPTION OF THE PREFERRED EMBODIMENT

Blower 1 forces air through duct 2 to combustion chamber 3 where air is heated and passes through duct 4 into the bottom of the fluidized bed dryer 5. Dryer 5 has a perforated plate 6 or the like in its bottom portion through which hot air passes. Air passes from dryer 5 through duct 7 which may lead to a cyclone separator, a scrubber, or like devices (not shown).

Two inlet pipes 10 and 11 are provided having the spray nozzles 12 and 13 attached thereto to spray a feed solution in dryer 5. Separate feed tanks 14 and 15 may be attached to the inlet pipes 10 and 11, or a single feed tank may be connected to pipes 10 and 11 for some applications.

If a feed solution containing about 50 percent solids is sprayed from nozzles 12 and 13, two vertically displaced fluidized beds 16 and 17 may be formed in dryer 5. As feed solution has water evaporated therefrom, particles will become coated with additional feed to form granules as water evaporates from the coating. Particles may also stick together to aggregate into granules.

If air below bed 17 is at 600°F for example, this air will cool to about 200°F. on leaving bed 17. A burner 20 may be provided to reheat this air prior to its fluidizing bed 16. By controlling this reheating by burner 20, the velocity of gas passing upward through bed 16 may be controlled to be lower than that passing through bed 17. Thus granules may be formed to a given size in bed 16 whereupon the heavier granules will fall downward to be fluidized in the bed 17 for further growth. After sufficient weight gain, the larger granules will fall from bed 17 to be removed as a product from pipe 19.

In some applications, feed of one content may be granulated in bed 16 to fall downward and be coated with or react with another material introduced from nozzle 13 in bed 17. This process is particularly applicable to product granules which do not melt in the dryer such as ammonium sulphate.

What is claimed is:

1. The process of aggregating particles in a fluidized bed dryer comprising the steps of:
    a. blowing air heated in an external burner upward in the dryer;
    b. introducing a 50 percent by weight aqueous solution of ammonium sulphate as feed to form particles fluidized into an upper bed of smaller particles fluidized in heated air flowing at a reduced velocity, the smaller particles aggregating to grow and fall from the upper bed and form a lower fluidized bed of larger particles in heated air flowing at a higher velocity;
    c. introducing a 50 percent by weight aqueous solution of ammonium sulphate as feed into the lower fluidized bed to further aggregate the particles therein to fall from the lower fluidized bed as product granules;
    d. collecting and removing the product granules of ammonium sulphate from the dryer; and
    e. further heating air between the fluidized beds by the controlled burning of fuel therein to increase and control the velocity of air in the upper fluidized bed while increasing the drying effect in the upper fluidized bed.

* * * * *